United States Patent Office 3,595,610
Patented July 27, 1971

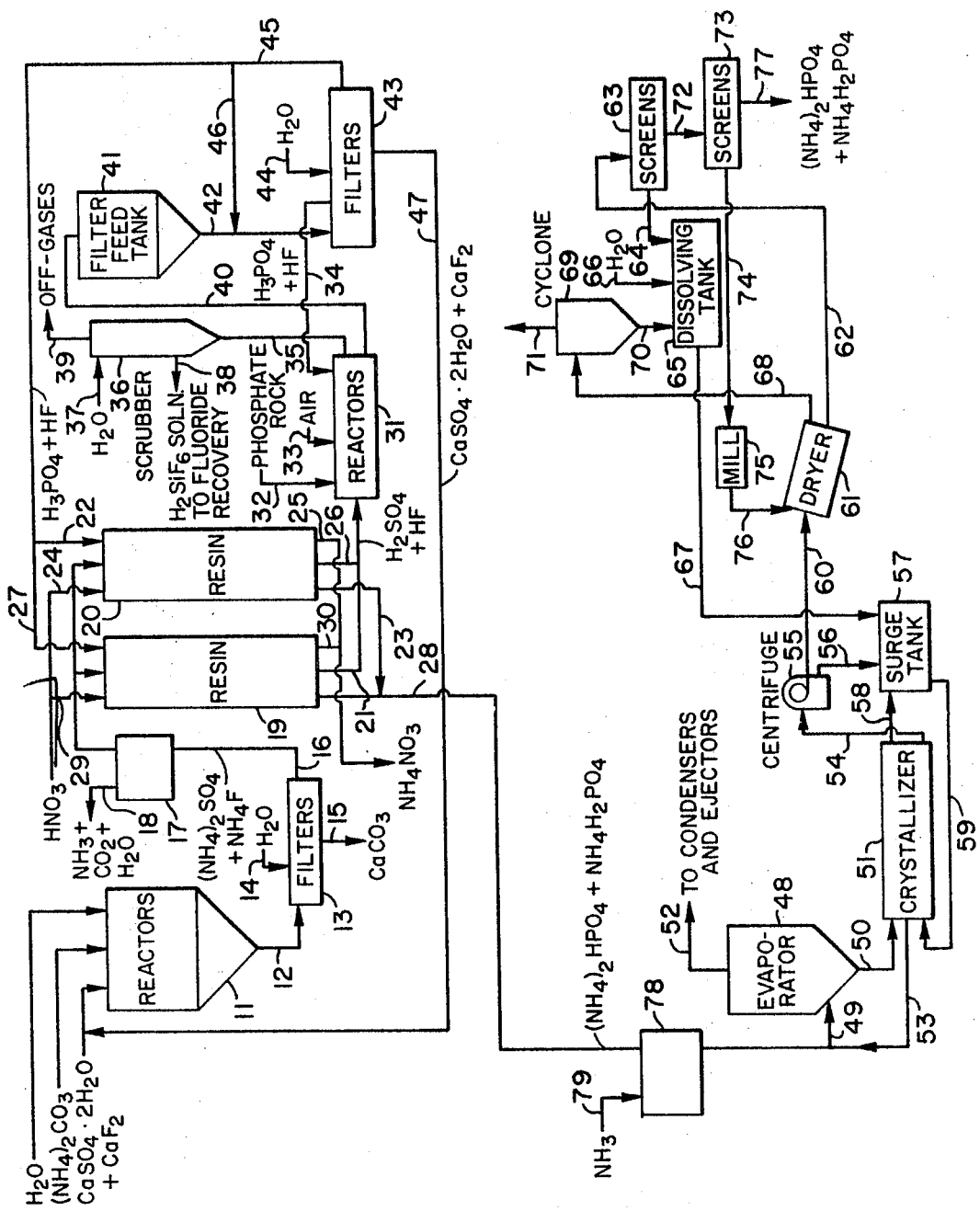

3,595,610
MANUFACTURE OF AMMONIUM PHOSPHATES
Fred H. Brinkman and Robert E. Williams, Houston,
Tex., assignors to Esso Production Research Company
Filed Nov. 14, 1968, Ser. No. 775,619
Int. Cl. C01b 25/28
U.S. Cl. 23—107            10 Claims

ABSTRACT OF THE DISCLOSURE

A process for the manufacture of an ammonium phosphate fertilizer wherein gypsum, phosphogypsum, anhydrite or a similar calcium sulfate is reacted with ammonium carbonate or ammonia and carbon dioxide to produce ammonium sulfate; the ammonium sulfate is contacted with a hydrogen ion exchange resin to form sulfuric acid which in turn is reacted with phosphate rock or the like to produce phosphoric acid; and this phosphoric acid is then used for regeneration of the ion exchange resin and the formation of ammonuim phosphate.

BACKGROUND OF THE INVENTION (1) Field of the invention

This invention relates to the manufacture of phosphate fertilizers and is particularly concerned with an improved process for the manufacture of ammonium phosphates.

(2) Description of the prior art

Much of the phosphate fertilizer currently produced is made by reacting ammonia with phosphoric acid. The acid employed is generally obtained by dissolving phosphate rock in sulfuric acid, holding the resultant slurry until calcium sulfate crystals of adequate size are obtained, filtering these crystals from the acid solution, and then concentrating the phosphoric acid to the desired level. This so-called "wet process" has advantages over the furnace method and other phosphoric acid manufacturing processes but has certain inherent disadvantages. These include difficulties arising because of the short supply of sulfur for the production of concentrated sulfuric acid and problems in disposing of the large quantities of calcium sulfate or phosphogypsum formed as a by-product. At present much of this material is discarded as waste.

SUMMARY OF THE INVENTION

This invention provides an improved process for the manufacture of ammonium phosphates for use in fertilizers and other applications which at least in part alleviates the difficulties referred to above. In accordance with the invention, it has now been found that ammonium phosphates can be produced by treating gypsum, phosphogypsum, anhydrite or a similar calcium sulfate with a solution containing ammonium and carbonate ions to produce ammonium sulfate and calcium carbonate, passing the ammonium sulfate in contact with a hydrogen ion exchange resin to form sulfuric acid and ammonium salts of the resin, utilizing the sulfuric acid thus produced to convert phosphate rock or a similar material to phosphoric acid, and then employing the phosphoric acid to regenerate the ion exchange resin and form the desired ammonium phosphates. This process has marked advantages over conventional processes in that it does not require the use of concentrated sulfuric acid produced from elemental sulfur and instead utilizes phosphogypsum, gypsum, anhydrite, or a similar calcium sulfate in place of the sulfuric acid. Calcium carbonate which can be used for the manufacture of cement and the generation of carbon dioxide and has other applications is produced as a by-product and hence the calcium sulfate disposal problem encountered in conventional processes is largely avoided. These and other advantages of the process of the invention often make it considerably more attractive than processes utilized heretofore.

BRIEF DESCRIPTION OF THE DRAWING

The drawing is a schematic flow plan illustrating the process of the invention.

DESCRIPTION OF THE PREFERRED EMBODIMENTS

The process of this invention utilizes gypsum, phosphogypsum, anhydrite or a similar calcium sulfate as a starting material. Gypsum is a native hydrated calcium sulfate consisting primarily of the dihydrate, $CaSO_4 \cdot 2H_2O$. Phosphogypsum is a by-product of the manufacture of phosphoric acid by conventional processes and also consists primarily of the dihydrate. Lesser quantities of calcium fluoride and other impurities are usually also present. Anhydrite, as the name suggests, is a native calcium sulfate containing no water of crystallization. Any of these materials may be utilized for purposes of the invention but obvious minor adjustments in the process may be necessary in switching from one such material to another.

As indicated in the drawing, the first step of the process is to react finely divided gypsum, phosphogypsum, anhydrite or a similar material with ammonium carbonate in the presence of water. This reaction can be represented by the following equation:

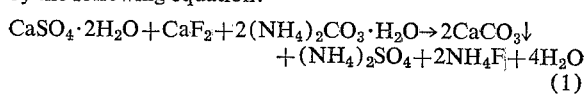

$$CaSO_4 \cdot 2H_2O + CaF_2 + 2(NH_4)_2CO_3 \cdot H_2O \rightarrow 2CaCO_3\downarrow + (NH_4)_2SO_4 + 2NH_4F + 4H_2O \quad (1)$$

This double decomposition reaction results in the formation of ammonium sulfate, ammonium fluoride and insoluble calcium carbonate. The amount of water utilized should be sufficient to maintain the ammonium sulfate formed in solution at the normal operating temperatures. If anhydrite is used as a starting material in place of the phosphogypsum indicated in Equation I above, the initial reaction of the process may be represented as follows:

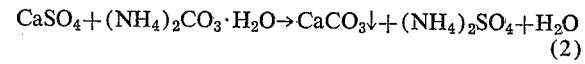

$$CaSO_4 + (NH_4)_2CO_3 \cdot H_2O \rightarrow CaCO_3\downarrow + (NH_4)_2SO_4 + H_2O \quad (2)$$

Gypsum may also be employed as a starting material in place of the phosphogypsum, in which case the initial reaction may be represented as shown below:

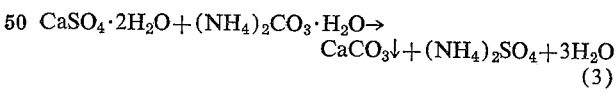

$$CaSO_4 \cdot 2H_2O + (NH_4)_2CO_3 \cdot H_2O \rightarrow CaCO_3\downarrow + (NH_4)_2SO_4 + 3H_2O \quad (3)$$

It will be understood that the above equations represent the overall reactions but that there are a number of competing reactions that also occur and that the products will therefore include compounds in addition to those shown. These by-products will normally be present as minor constituents and can be removed later if highly purified products are required.

The process of the invention is essentially the same regardless of which of the three basic starting materials is used and hence only the use of phosphogypsum as a starting material will be discussed in detail. Minor modifications that may be made if gypsum or anyhidrite is used will be obvious to those skilled in the art.

The reaction of the ammonium carbonate with the phosphogypsum or other calcium sulfate is carried out in stirred reactors 11 provided with steam coils, jackets, or other heating means. The ammonium carbonate to be used is first dissolved in water to form an ammonium carbonate solution and the solid phosphogypsum to be employed is then added to form a reaction slurry. The phosphogypsum will normally be in finely divided form. If gypsum or anhydrite is used, the material will generally have been crushed in a jaw crusher or similar device and then passed through a hammer mill, ball mill or the like to produce particles of reasonably uniform size. It is generally preferred to employ coarse particles screened to a size of from about 50 to about 150 mesh on the U.S. Sieve Series scale. Particles significantly larger may be more difficult to react because of their lower surface area per unit volume whereas those significantly smaller may be difficult to handle during later filtration operations. A plurality of reaction vessels connected in series will ordinarily be used to prevent rapid dilution of the fresh ammonium carbonate solution by spent liquor. The reaction is reversible and hence an excess of ammonium carbonate is normally employed to force it toward the ammonium sulfate side. As the reaction proceeds, calcium carbonate is formed at the surfaces of the phosphogypsum particles. Continuous agitation should be provided to avoid agglomeration of the particles and promote effective contact between the liquid and suspended solids. It is generally preferred to maintain a reaction temperature in the range between about 140° F. and about 180° F. in order to obtain maximum conversion of the calcium sulfate to calcium carbonate in a period of from about 4 to about 6 hours. Temperatures outside of the specified range may, however, be used if desired.

In lieu of treating the phosphogypsum with a solution prepared by dissolving ammonium carbonate in water as described above, the process can be carried out with liquid or gaseous ammonia, water, carbon dioxide gas, and phosphogypsum. The reaction of the ammonia and water to form ammonium hydroxide and the subsequent reaction of this with carbon dioxide to form the ammonium carbonate solution are both exothermic reactions resulting in the liberation of substantial quantities of heat. If this procedure is used, it will therefore normally be preferred to react the ammonia with water and then contact the resulting solution with carbon dioxide in a packed column containing a plurality of stages. Countercurrent flow will ordinarily be used. Cooling coils or other means for removing excess heat should be installed between adjacent stages in the column to maintain the temperature of the reaction solution below about 150° F., preferably below about 120° F. Unless the temperature is properly controlled in each stage, difficulties due to premature termination of the carbonation reaction may be encountered.

As indicated in the equation set forth earlier, phosphogypsum normally contains calcium fluoride in addition to the calcium sulfate. This calcium fluoride reacts with the ammonium carbonate to form ammonium fluoride and additional calcium carbonate. At least part of the fluoride will be removed at a later stage in the process. Phosphoric acid and calcium phosphate, neither of which has any serious effect on the overall process, may also be present in the phosphogypsum as contaminants.

The slurry produced in reactors 11 normally contains calcium carbonate, ammonium sulfate, ammonium fluoride, unreacted ammonium carbonate, water, and other compounds formed from impurities in the phosphogypsum or other calcium sulfate source employed. This slurry is withdrawn from the last reactor through line 12 and filtered in a multistage filtration plant 13 for removal of the insoluble calcium carbonate. It is generally preferred to employ continuous rotary filters arranged in two stages for this purpose. In the first stage, a wet filter cake containing a high percentage of the ammonium sulfate liquor is produced. This cake is reslurried with wash solution from the second stage and then refiltered in the second stage to recover the additional ammonium sulfate. Water introduced into the system through line 14 is employed to wash the cake produced in the second stage. The calcium carbonate from the filtration operation is withdrawn from the system as indicated by reference numeral 15 and may be dried, stored or bagged for use as agricultural lime, for use in the manufacture of cement, or for other purposes.

The filtrate from filters 13 is withdrawn through line 16. The solution thus obtained will normally contain a small amount of very fine calcium carbonate that passed through the filter medium and hence it may be desirable to transfer the solution to a clarifier, settling tank, or similar equipment, not shown in the drawing, for the removal of this material. The subsequent treatment of the filtrate in this manner may be unnecessary if a highly efficient multistage filtration system is employed. The arrangement of the necessary equipment where this step is to be utilized will be apparent to those skilled in the art.

The ammonium sulfate solution in line 16 may be passed to a low temperature evaporator or other vessel 17 provided with heating coils or the like to drive off excess ammonium carbonate and any gases that may be present and to convert the ammonium sulfate to ammonium bisulfate if desired. This reduces the volume of liquor to be handled and facilitates later regeneration of the ion exchange columns. Offgases including ammonia, carbon dioxide, and water vapor are taken overhead through line 18 to a scrubber or other recovery equipment not shown in the drawing.

The ammonium sulfate or ammonium bisulfate liquor produced as described above is transferred into one of two or more ion exchange columns designated in the drawing by reference numerals 19 and 20. These columns are arranged so that the sulfate or bisulfate solution can be contacted with fresh resin in at least one column while the resin in at least one other column is being regenerated. The resin employed may be any of a number of commercially available cationic exchange resins. These resins are generally water insoluble synthetic polymers having sulfonic acid groups or other radicals containing readily replaceable hydrogen atoms. When such a resin is contacted with a solution of ammonium sulfate or a similar metallic salt, the resin gives up hydrogen ions in exchange for the ammonium or metal ions in the solution. The spent resin can later be regenerated by contacting it with a solution of a strong acid to replace the ammonium or metal ions with hydrogen ions. Such resins have been described at length in the technical literature.

During the cyclic ion exchange process, ammonium sulfate or ammonium bisulfate solution including some ammonium fluoride is introduced into the upper part of ion exchange column 19 and flows downwardly through the bed of resin particles contained in the column. The resin is converted from the hydrogen form to the ammonium form as the exchange reaction takes place. Sulfuric acid containing some hydrofluoric acid is withdrawn from the lower part of column 19 through line 21. This acid solution will normally contain up to about 35% sulfuric acid. The concentration can be increased if desired by passing the solution through an evaporator or concentrator, not shown in the drawing. A variety of commercial evaporators and concentrators may be used for this purpose. Highly concentrated sulfuric acid can also be added to the effluent from column 19 to increase the acid concentration if necessary to produce phosphoric acid of the desired strength.

During the period that the resin in column 19 is being used to convert ammonium sulfate or ammonium bisulfate and ammonium fluoride to sulfuric acid and hydrofluoric acid, the resin in column 20 is being regenerated. A stream of phosphoric acid containing some hydrofluoric acid is introduced into the upper part of the column through line 22 from a later stage of the process. The acid mixture flows downwardly through the bed of resin particles. Hydrogen ions from the acid replace the ammonium ions on the resin, thus converting it from the ammonium form back to the hydrogen form. This results in the production of a mixture of mono- and diammonium phosphates. These are recovered through line 23 and processed in a manner to be described hereafter. Treatment of the resin with the phosphoric acid may not completely regenerate it and hence concentrated nitric acid may be introduced into the upper part of column 20 through line 24 following the phosphoric acid treatment. This results in the removal of ammonium ions left on the resin and the production of an ammonium nitrate solution which is recovered from the lower part of column 20 by means of line 25. This ammonium nitrate can be concentrated and crystallized for use as a chemical raw material or fertilizer by conventional methods that will be familiar to those skilled in the art.

The ion exchange carried out in columns 19 and 20 is, as pointed out earlier, a cyclic operation. After the resin in column 19 has been spent in converting ammonium sulfate or ammonium bisulfate and ammonium fluoride to sulfuric acid and hydrofluoric acid and the resin in column 20 has been regenerated, the input stream of ammonium sulfate or ammonium bisulfate and ammonium fluoride is switched from column 19 to column 20. Sulfuric acid and hydrofluoric acid produced in column 20 is withdrawn through line 26. Simultaneously, phosphoric acid is introduced into the upper part of column 19 through line 27 and a mixture of monoammonium phosphate and diammonium phosphate is withdrawn from the column through line 28. Following at least partial regeneration with the phosphoric acid, nitric acid introduced through line 29 may be employed for the final regeneration of the resin in column 19. Ammonium nitrate is recovered through line 30. Although only two ion exchange columns are indicated in the drawing, it will often be advantageous to employ more than two columns. The valves, pumps, instrumentation, and other equipment necessary to permit the cyclic operation are not shown in the drawing but will be readily apparent to those skilled in the art.

The acid withdrawn from the ion exchange columns 19 and 20 through lines 21 and 26 is reacted with phosphate rock in reactors 31. The phosphate rock employed will normally contain from about 30 to 35 percent phosphorous pentoxide, from about 5 to about 8 percent silica dioxide, from 45 to about 50 percent calcium oxide, from about 3 to about 4 percent fluorine, and lesser quantities of aluminum oxide, ferrous oxide, manganese oxide, magnesium oxide, potassium oxide, sodium oxide and other constituents. The rock is normally ground to a particle size between about 100 to about 325 mesh and may have been calcined to remove moisture and organic materials. The reactors used will normally consist of a large initial stage into which the phosphate rock, sulfuric acid, and recycle phosphoric acid are introduced and one or more subsequent stages in which further reaction takes place at a lower temperature than that maintained in the initial stage. A single large tank or a series of tanks can be employed for the initial stage and an elevator or similar device, indicated by reference numeral 32, will be used to introduce the finely ground phosphate rock. Each stage will ordinarily be provided with means for agitating the reactants and preventing the solids from settling out of the slurry and with means for removing excess heat and controlling the slurry temperature. Air bubbled into the slurry through line 33 can be used to provide both cooling and agitation if desired. Recycle phosphoric acid may be introduced into the initial stage through line 34. Provisions for the recycle of slurry between stages will ordinarily be made but the arrangement used will depend to a large extent upon the particular reactor system employed. The portion of the process can be carried out with any of a number of different systems conventionally employed for the manufacture of wet process phosphoric acid and hence wide variations in equipment design are possible. Wet process acid plants have been described in detail in the technical literature and will be familiar to those skilled in the art.

The gases produced during reaction of the acids with the phosphate rock, together with air introduced into the system for cooling and agitation purposes, are withdrawn overhead from each reactor or digestor stage through line 35 and are conveyed to a scrubber 36. Water introduced into the upper part of the scrubber through line 37 flows countercurrent to the ascending gases. Silicon tetrafluoride produced in the digestors by the reaction of hydrogen fluoride with silicon dioxide is hydrolyzed to form fluorosilicic acid. The resulting fluorosilicic acid solution is withdrawn from the scrubber through line 38 and may be passed to a conventional fluorine recovery unit. This solution will also contain hydrogen fluoride which may be precipitated by the addition of lime. The fluorosilicic acid can be concentrated and recovered for sale or converted to sodium fluorosilicate by neutralization with sodium carbonate, crystallization, centrifugation, and drying. The overhead gases from the scrubber, withdrawn through line 39, may be discharged into the atmosphere. Although a single scrubber is shown in the drawing, two or more countercurrent scrubbers connected in series may be used, particularly where the fluorine content of the phosphate rock employed is relatively high.

The product from reactors or digestors 31 normally consists of a slurry of calcium sulfate and calcium fluoride in a crude phosphoric acid solution containing up to about 30 percent phosphorous pentoxide. This slurry is withdrawn through line 40 to a filter feed tank 41 where agitation is provided to prevent settling of the solids. The slurry from tank 41 is fed through line 42 to a bank of filters used to separate the solids from the liquid phase. The filters, indicated by reference numeral 43, may be of the moving belt, moving pan, or horizontal rotary type. A plurality of filters arranged in stages and provided with means for utilizing the filtrate from one stage as a wash fluid in another will normally be used. It is generally preferred to charge the first filter stage with the slurry from the reactors or digestors and to withdraw the filtrate from the first stage as full strength product acid. Water is introduced as a wash fluid through line 44 to the last stage and the filtrate is pumped back to the intermediate stage or stages. The filtrate from a second stage will normally be recycled to the reactor or digestor through line 34 as recycled phosphoric acid. The filters are normally operated at a pressure of from 15 to 20 inches of mercury. The precise filter arrangement will depend on the particular type of filters selected.

The filtrate from the initial stage in filters 43 is withdrawn through line 45 as full strength phosphoric acid and may be charged to ion exchange columns 19 and 20 alternately through lines 27 and 22 respectively. Line 46 is provided for the recycle of full strength acid to the filters desired. The acid produced may be passed through a vacuum evaporator, not shown in the drawing, to increase the acid concentration but this normally increases the cost of the operation and is therefore avoided. The filter cake, composed primarily of gypsum but also containing some calcium fluoride, is withdrawn as indicated by reference numeral 47 and may be recycled for treatment with ammonium carbonate in the initial stage of the process. A portion of the phosphogypsum produced will normally be discarded and the rest be mixed with fresh phosphogypsum for treatment with the ammonium carbonate in order to keep the insoluble solids present at a suitably low level.

The solution of monoammonium and diammonium phosphate recovered from ion exchange columns 19 and 20 through lines 28 and 23 is passed to a vacuum evaporator 48 through line 49. The underflow from the evaporator is discharged through line 50 into a vacuum crystallizer 51. The overhead vapors from the evaporator are taken off through line 52 to the condensers and steam ejectors, not shown in the drawing. The vacuum in the evaporator is controlled to maintain the slurry in the crystallizer at a temperature of about 125° M. so that the monoammonium and diammonium phosphate will crystallize from the mother liquor with little loss of ammonia. Fluid is recycled from the crystallizer to the evaporator through line 53. The slurry containing the crystals formed in the crystallizer is withdrawn through line 54 to a centrifuge 55 where the crystals are separated from the mother liquor. The fluid is discharged from the centrifuge through line 56 to a surge tank 57. Overflow from the crystallizer also passes to the surge tank through line 58. From the surge tank, fluid may be recycled to the crystallizer through line 59. The crystallizer and associated equipment are normally operated to maintain up to about 30 percent by volume of crystals in the slurry.

The crystals separated from the mother liquor in centrifuge 55 are passed through line 60 to a countercurrent rotary dryer 61 supplied with hot air at a temperature of about 300° F. The dry crystals at a temperature of about 150° F. are discharged from the dryer as indicated by line 62 and fed through a screen 63 where the fines smaller than about 30 mesh are removed. These fines are conveyed by means of line 64 to a dissolving tank 65 where they are dissolved in water added through line 66. The resulting ammonium phosphate solution is returned to the surge tank through line 67. Additional fines taken overhead with the gases from the dryer through line 68 are introduced into a cyclone separator 69 and introduced into the dissolving tank through line 70. The overhead gases from the separator are discharged to the atmosphere through line 71. Monoammonium phosphate and diammonium phosphate freed from fines by screen 63 is conveyed by line 72 to screen 73. Here the oversized lumps taken out and transmitted by line 74 to a hammermill 75 where they are crushed into smaller particles. These are then returned to the dryer by way of line 76. The dried screened monoammonium and diammonium phosphate crystals are withdrawn from the system through line 77 to be bagged or stored in bulk.

The plant described above can be modified if desired to produce diammonium phosphate, rather than a mixture of monoammonium phosphate and diammonium phosphate, by treating the ammonium phosphate solution recovered from the ion exchange columns is a vessel 78 with ammonia introduced through line 79 before the solution is fed to the evaporator and crystallizer. It is preferred to employ anhydrous ammonia for this purpose.

What is claimed is:

1. A process for the manufacture of an ammonium phosphate which comprises reacting calcium sulfate with ammonium carbonate to form a slurry of calcium carbonate in an ammonium sulfate solution; contacting said ammonium sulfate solution with a cationic ion exchange resin in the hydrogen form to convert said resin to the ammonium form and produce sulfuric acid; reacting said sulfuric acid with calcium phosphate to form a slurry of calcium sulfate in a phosphoric acid solution; contacting said phosphoric acid solution with said resin in the ammonium form to produce an ammonium phosphate and at least partially restore said resin to the hydrogen form; and recovering said ammonium phosphate.

2. A process as defined by claim 1 wherein the calcium sulfate reacted with said ammonium carbonate comprises phosphogypsum.

3. A process as defined by claim 1 wherein the calcium sulfate reacted with said ammonium carbonate comprises anhydrite.

4. A process as defined by claim 1 wherein the calcium sulfate reacted with said ammonium carbonate comprises gypsum.

5. A process as defined by claim 1 wherein said resin is contacted with nitric acid following contact of the resin with said phosphoric acid.

6. A process as defined by claim 1 wherein calcium sulfate is recovered from said slurry of calcium sulfate in said phosphoric acid solution and is recycled for reaction with ammonium carbonate.

7. A process as defined by claim 1 wherein said ammonium carbonate is produced by the reaction of ammonia with carbon dioxide.

8. A process as defined by claim 5 wherein ammonium nitrate is recovered from said resin following treatment of the resin with said nitric acid and said ammonium phosphate are blended for use as a fertilizer.

9. A process as defined by claim 1 wherein said ammonium phosphate comprises a mixture of monoammonium phosphate and diammonium phosphate.

10. A process as defined by claim 1 wherein said ammonium sulfate solution is heated prior to being contacted with said resin.

References Cited
UNITED STATES PATENTS

| | | | |
|---|---|---|---|
| 1,761,400 | 6/1930 | Liljenroth | 71—43X |
| 2,657,977 | 11/1953 | Stengel et al. | 71—59X |
| 2,707,670 | 5/1955 | Munekata et al. | 23—193 |
| 3,096,153 | 7/1963 | Hadzeriga | 23—121 |
| 3,099,528 | 7/1963 | Hadzeriga | 23—89 |
| 3,366,468 | 1/1968 | Porter | 71—35 |

EARL C. THOMAS, Primary Examiner

G. A. HELLER, Assistant Examiner

U.S. Cl. X.R.

71—43, 59; 23—165, 167